US012792932B2

(12) United States Patent
Dai et al.

(10) Patent No.: US 12,792,932 B2
(45) Date of Patent: Nov. 10, 2026

(54) KNOWLEDGE GRAPH COMPLETION AND MULTI-HOP REASONING IN KNOWLEDGE GRAPHS AT SCALE

(71) Applicant: Google LLC, Mountain View, CA (US)

(72) Inventors: Hanjun Dai, San Jose, CA (US); Dale Eric Schuurmans, Edmonton (CA); Xinyun Chen, Berkeley, CA (US); Dengyong Zhou, Redmond, WA (US); Bo Dai, San Jose, CA (US); Hongyu Ren, Stanford, CA (US)

(73) Assignee: GOOGLE LLC, Mountain View, CA (US)

( * ) Notice: Subject to any disclaimer, the term of this patent is extended or adjusted under 35 U.S.C. 154(b) by 859 days.

(21) Appl. No.: 18/183,410

(22) Filed: Mar. 14, 2023

(65) Prior Publication Data

US 2023/0289626 A1 Sep. 14, 2023

Related U.S. Application Data

(60) Provisional application No. 63/319,558, filed on Mar. 14, 2022.

(51) Int. Cl.
*G06N 5/022* (2023.01)
*G06F 16/2453* (2019.01)

(52) U.S. Cl.
CPC ......... *G06N 5/022* (2013.01); *G06F 16/2453* (2019.01)

(58) Field of Classification Search
CPC ........... G06N 5/00; G06N 5/02; G06N 5/022; G06N 20/00; G06F 16/2453; G06F 16/24539
See application file for complete search history.

(56) References Cited

U.S. PATENT DOCUMENTS

2010/0262574 A1* 10/2010 Zhou ........................ G06N 5/02 707/E17.05
2020/0074319 A1* 3/2020 Lecue .................... G06N 3/006
(Continued)

OTHER PUBLICATIONS

Arakelyan et al., "Complex Query Answering with Neural Link Predictors.", arXiv:2011.03459v4. Mar. 18, 2021, 14 pages.
(Continued)

*Primary Examiner* — Tamara T Kyle
*Assistant Examiner* — William Wong
(74) *Attorney, Agent, or Firm* — DORITY & MANNING, P.A.

(57) ABSTRACT

Provided are computing systems, methods, and platforms for negative sampling in knowledge graphs with improved efficiency. A knowledge graph comprising entities and links between the entities can be obtained. A query computation graph comprising nodes and edges can be generated based on the knowledge graph. The nodes of the query computation graph can include anchor nodes, a root node, and intermediate nodes positioned in paths between the anchor nodes and the root node. A node cut of a query of the query computation graph can be determined and can include at least one node that cuts at least one path between each anchor node and the root node of the query computation graph. Negative samples can be identified by bidirectionally traversing the query computation graph in a first direction from the anchor nodes to the node cut and in a second direction from the root node to the node cut.

20 Claims, 9 Drawing Sheets

(56) References Cited

U.S. PATENT DOCUMENTS

| | | | | |
|---|---|---|---|---|
| 2020/0134477 | A1* | 4/2020 | Lee | G06N 20/00 |
| 2020/0342462 | A1* | 10/2020 | Todd | G06F 40/205 |
| 2021/0034945 | A1* | 2/2021 | Mane | G06N 3/045 |
| 2021/0110457 | A1* | 4/2021 | Polanía | G06F 16/532 |
| 2021/0319329 | A1* | 10/2021 | Yang | G06F 16/9024 |
| 2022/0383127 | A1* | 12/2022 | Altaf | G06N 3/09 |
| 2022/0398432 | A1* | 12/2022 | Porter | G06N 5/022 |

OTHER PUBLICATIONS

Berant et al., "Semantic Parsing on Freebase from Question-Answer Pairs.", 2013 Conference on Empirical Methods in Natural Language Processing, Oct. 18-21, 2013, Seattle, Washington, United States, pp. 1533-1544.
Bollacker et al., "Freebase: A Collaboratively Created Graph Database for Structuring Human Knowledge.", SIGMOD '08: 2008 ACM SIGMOD International Conference on Management of Data, Jun. 10-12, 2008, pp. 1247-1250.
Bordes et al., "Translating Embeddings for Modeling Multi-Relational Data.", Twenty-sixth International Conference on Neural Information Processing Systems, vol. 2, Dec. 5-10, 2013, pp. 2787-2795.
Carlson et al., "Toward an Architecture for Never-Ending Language Learning.", Twenty-Fourth AAAI Conference on Artificial Intelligence, Jul. 11-15, 2010, Atlanta, Georgia, United States, vol. 24, No. 1, pp. 1306-1313.
Chen et al., "Fuzzy Logic Based Logical Query Answering on Knowledge Graphs.", arXiv:2108.02390v2, Jun. 16, 2022, 21 pages.
Choudhary et al., "Probabilistic Entity Representation Model for Reasoning over Knowledge Graphs.", arXiv:2110.13522v2, Oct. 30, 2021, 16 pages.
Das et al., "Chains of Reasoning over Entities, Relations, and Text using Recurrent Neural Networks.", arXiv:1607.01426v3, May 1, 2017, 10 pages,.
Feng et al., "Scalable Multi-Hop Relational Reasoning for Knowledge-Aware Question Answering.", arXiv:2005.00646v2. Sep. 18, 2020, 14 pages.
Fey et al., "GNNAutoScale: Scalable and Expressive Graph Neural Networks via Historical Embeddings.", arXiv:2106.05609v1, Jun. 10, 2021, 18 pages.
Github, "Drkg—Drug Repurposing Knowledge Graph for Covid-19", 2020, https://github.com/gnn4dr/DRKG/, retrieved on Oct. 24, 2023, 8 pages.
Github, "KGReasoning.", 2021, https://github.com/snap-stanford/KGReasoning, retrieved on Oct. 24. 2023. 3 pages.
Github, "Paddle Graph Learning.", 2020, https://github.com/PaddlePaddle/PGL, retrieved on Oct. 24, 2023, 7 pages.
Github, "SMORE: Knowledge Graph Completion and Multi-hop Reasoning in Massive Knowledge Graphs.", https://github.com/google-research/smore, retrieved Oct. 24, 2023, 3 pages.
Guu et al., "Traversing Knowledge Graphs in Vector Space.", arXiv:1506.01094v2, Aug. 19, 2015. 10 pages.
Hamilton et al., "Embedding Logical Queries on Knowledge Graphs.", arXiv:1806.01445v4, Oct. 29, 2019, 15 pages.
Hu et al., "Open Graph Benchmark: Datasets for Machine Learning on Graphs.", arXiv:2005.00687v7, Feb. 25. 2021. 34 pages.
Kingma et al., "Adam: A Method For Stochastic Optimization.", arXiv:1412.6980v9, Jan. 30, 2017, 15 pages.
Kotnis et al., "Answering Complex Queries in Knowledge Graphs with Bidirectional Sequence Encoders.", arXiv:2004.02596v4, Feb. 4, 2021, 9 pages.
Lerer et al., "PyTorch-BigGraph: A Large-scale Graph Embedding System.", arXiv:1903.12287v3, Apr. 9, 2019, 12 pages.
Lin et al., "KagNet: Knowledge-Aware Graph Networks for Commonsense Reasoning.", arXiv:1909.02151v1. Sep. 4, 2019, 11 pages.
Liu et al., "Conceptnet—A Practical Commonsense Reasoning Tool-Kit.", BT Technology Journal, vol. 22, No. 4, Oct. 2004, 16 pages.
Liu et al., "Neural-Answering Logical Queries on Knowledge Graphs.", Knowledge Discovery and Data '21: Twenty-seventh ACM SIGKDD Conference on Knowledge Discovery & Data Mining, Aug. 14-18, 2021, pp. 1087-1097.
Lv et al., "Graph-Based Reasoning over Heterogeneous External Knowledge for Commonsense Question Answering.", arXiv:1909.05311v2, Jun. 9, 2020, 9 pages.
Mohoney et al., "Marius: Learning Massive Graph Embeddings on a Single Machine.", arXiv:2101.08358v2, May 26, 2021, 17 pages.
Niu et al., "HOGWILD !: A Lock-Free Approach to Parallelizing Stochastic Gradient Descent.", arXiv:1106.5730v2, Nov. 11, 2011, 22 pages.
Paske et al., "PyTorch: An Imperative Style, High-Performance Deep Learning Library.", arXiv:1912.01703v1, Dec. 3, 2019, 12 pages.
Ren et al., "Beta Embeddings for Multi-Hop Logical Reasoning in Knowledge Graphs.", arXiv:2010.11465v1, Oct. 22, 2020, 14 pages.
Ren et al., "LEGO: Latent Execution-Guided Reasoning for Multi-Hop Question Answering on Knowledge Graphs.", Thirty-eight International Conference on Machine Learning, Jul. 18-24, 2021, Virtual, 12 pages.
Ren et al., "Query2box: Reasoning Over Knowledge Graphs in Vector Space Using Box Embeddings.", arXiv:2002.05969v2. Feb. 29, 2020, 17 pages.
Ren et al., "SMORE: Knowledge Graph Completion and Multi-hop Reasoning in Massive Knowledge Graphs.", arXiv:2110.14890v2, Nov. 1, 2021, 18 pages.
Ruiz et al., "Identification of Disease Treatment Mechanisms through the Multiscale Interactome.", Nature Communications, Mar. 19, 2021, vol. 12, 15 pages.
Saxena et al., "Improving Multi-hop Question Answering over Knowledge Graphs Using Knowledge Base Embeddings.", Fifty-eighth Annual Meeting of the Association for Computational Linguistics, Jul. 5-10, 2020, Virtual, 10 pages.
Slideslive.com, "ICML 2021—Scaling fup Logical Query Embeddings on Knowledge Graphs.", Jul. 23, 2021, https://slideslive.com/38964672/scaling-fup-logical-query-embeddings-on-knowledge-graphs, 2 pages.
Stanford.Edu, "Tutorial @ Learning on Graph Conference 2022: Complex Reasoning Over Relational Databases SMORE + Scallop.", https://snap.stanford.edu/logtutorial/, retrieved on May 24, 2023, 1 page.
Suchanek et al., "Yago: A Core of Semantic Knowledge.", Sixteenth International Conference on World Wide Web, May 8-12, 2007, Alberta, Canada, 10 pages.
Sun et al., "Faithful Embeddings for Knowledge Base Queries.", arXiv:2004.03658v3, Jan. 29, 2021, 17 pages.
Sun et al., "Open Domain Question Answering Using Early Fusion of Knowledge Bases and Text.", arXiv:1809.00782v1. Sep. 4, 2018, 12 pages.
Sun et al., "PullNet: Open Domain Question Answering with Iterative Retrieval on Knowledge Bases and Text.", arXiv:1904.09537y1, Apr. 21, 2019, 11 pages.
Sun et al., "RotatE: Knowledge Graph Embedding by Relational Rotation in Complex Space.", arXiv:1902.10197v1, Feb. 26, 2019, 18 pages.
Talmor et al., "The Web as a Knowledge-base for Answering Complex Questions.", arXiv:1803.06643v1, Mar. 18, 2018, 14 pages.
Trouillon et al., Complex Embeddings for Simple Link Prediction., arXiv:1606.06357v1, Jun. 20, 2016, 12 pages.
Wang et al., "DKN: Deep Knowledge-Aware Network for News Recommendation.", arXiv:1801.08284v2, Jan. 30, 2018, 10 pages.
Wang et al., "Knowledge-aware Graph Neural Networks with Label Smoothness Regularization for Recommender Systems.", arXiv:1905.04413v3, Jun. 14, 2019, 10 pages.
Wu et al., "Dual Graph Attention Networks for Deep Latent Representation of Multifaceted Social Effects in Recommender Systems.", arXiv:1903.10433v1, Mar. 25, 2019, 11 pages.
Yang et al., "Embedding Entities and Relations for Learning and Inference in Knowledge Bases.", arXiv:1412.6575v4, Aug. 29, 2015, 12 pages.

(56) References Cited

OTHER PUBLICATIONS

Yasunaga et al., "QA-GNN: Reasoning with Language Models and Knowledge Graphs for Question Answering.", Dec. 13, 2022, 13 pages.
Ying et al., "Graph Convolutional Neural Networks for Web-Scale Recommender Systems.", arXiv:1806,01973v1, Jun. 6, 2018, 10 pages.
Zhang et al., "ConB: Cone Embeddings for Multi-Hop Reasoning over Knowledge Graphs.", arXiv:2110.13715v2, Dec. 22, 2021, 22 pages.
Zheng et al., "DGL-KE: Training Knowledge Graph Embeddings at Scale.", arXiv:2004.08532v1, Apr. 18. 2020, 11 pages.
Zhu et al., "Graph Vite: A High-Performance CPU-GPU Hybrid System for Node Embedding.". arXiv:1903.00757v1. March 2. 2019, 11 pages.
Zitnik et al., "Modeling Polypharmacy Side Effects with Graph Convolutional Networks.", arXiv:1802.00543v2, Apr. 26, 2018, 9 pages.

* cited by examiner

KNOWLEDGE GRAPH COMPLETION AND MULTI-HOP REASONING IN KNOWLEDGE GRAPHS AT SCALE

RELATED APPLICATIONS

This application claims priority to and the benefit of U.S. Provisional Patent Application No. 63/319,558, filed Mar. 14, 2022, which is hereby incorporated by reference in its entirety.

FIELD

The present disclosure relates generally to knowledge graphs. More particularly, the present disclosure relates to performing negative sampling over knowledge graphs with improved efficiency.

BACKGROUND

A knowledge graph is a graph structure that captures knowledge encoded in a form of head-relation-tail triples, where the head and tail are two entities (i.e., nodes) and the relation is an edge between them (e.g., (Paris, CapitalOf, France)). Knowledge graphs form the backbone of many artificial intelligence systems across a wide range of domains, such as recommender systems, question answering, commonsense reasoning, personalized medicine, and drug discovery. In some cases, reasoning over such knowledge graphs includes two types of tasks: (1) single-hop link prediction, where given a head and a relation the goal is to predict one or more tail entities, and (2) multi-hop reasoning, where one needs to predict one or many of the tails of a multi-hop logical query. Finding answers to such a query can involve imputation and prediction of multiple edges across two parallel paths, while also using logical set operations (e.g., intersection, union).

SUMMARY

Aspects and advantages of embodiments of the present disclosure will be set forth in part in the following description, or can be learned from the description, or can be learned through practice of the embodiments.

One example aspect of the present disclosure is directed to a method for negative sampling with improved efficiency. The method includes obtaining a knowledge graph comprising a plurality of entities and a plurality of links between the plurality of entities, wherein a link from among the plurality of links is between at least two entities from among the plurality of entities and describes a relation between the at least two entities. The method further includes generating, based on the knowledge graph, a query computation graph comprising a plurality of nodes and a plurality of edges, wherein the plurality of nodes comprises one or more anchor nodes, a root node, and one or more intermediate nodes positioned in one or more paths between the one or more anchor nodes and the root node. The method further includes determining a node cut of a query of the query computation graph, wherein the node cut comprises at least one node that cuts at least one path between each anchor node from among the one or more anchor nodes of the query computation graph and the root node of the query computation graph. The method further includes identifying one or more negative samples for the query computation graph by bidirectionally traversing the query computation graph in a first direction from the one or more anchor nodes to the node cut and in a second direction from the root node to the node cut.

Another example aspect of the present disclosure is directed to a computing system. The computing system includes one or more processors and one or more tangible, non-transitory computer-readable media that collectively store instructions that, when executed by the one or more processors, cause the one or more processors to perform operations. The operations include obtaining a knowledge graph comprising a plurality of entities and a plurality of links between the plurality of entities, wherein a link from among the plurality of links is between at least two entities from among the plurality of entities and describes a relation between the at least two entities. The operations further include generating, based on the knowledge graph, a query computation graph comprising a plurality of nodes and a plurality of edges, wherein the plurality of nodes comprises one or more anchor nodes, a root node, and one or more intermediate nodes positioned in one or more paths between the one or more anchor nodes and the root node. The operations further include determining a node cut of a query of the query computation graph, wherein the node cut comprises at least one node that cuts at least one path between each anchor node from among the one or more anchor nodes of the query computation graph and the root node of the query computation graph. The operations further include identifying one or more negative samples for the query computation graph by bidirectionally traversing the query computation graph in a first direction from the one or more anchor nodes to the node cut and in a second direction from the root node to the node cut.

Another example aspect of the present disclosure is directed to one or more tangible, non-transitory computer-readable media that collectively store instructions that, when executed by one or more processors, cause the one or more processors to perform operations. The operations include obtaining a knowledge graph comprising a plurality of entities and a plurality of links between the plurality of entities, wherein a link from among the plurality of links is between at least two entities from among the plurality of entities and describes a relation between the at least two entities. The operations further include generating, based on the knowledge graph, a query computation graph comprising a plurality of nodes and a plurality of edges, wherein the plurality of nodes comprises one or more anchor nodes, a root node, and one or more intermediate nodes positioned in one or more paths between the one or more anchor nodes and the root node. The operations further include determining a node cut of a query of the query computation graph, wherein the node cut comprises at least one node that cuts at least one path between each anchor node from among the one or more anchor nodes of the query computation graph and the root node of the query computation graph. The operations further include identifying one or more negative samples for the query computation graph by bidirectionally traversing the query computation graph in a first direction from the one or more anchor nodes to the node cut and in a second direction from the root node to the node cut.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures.

Figure 1:
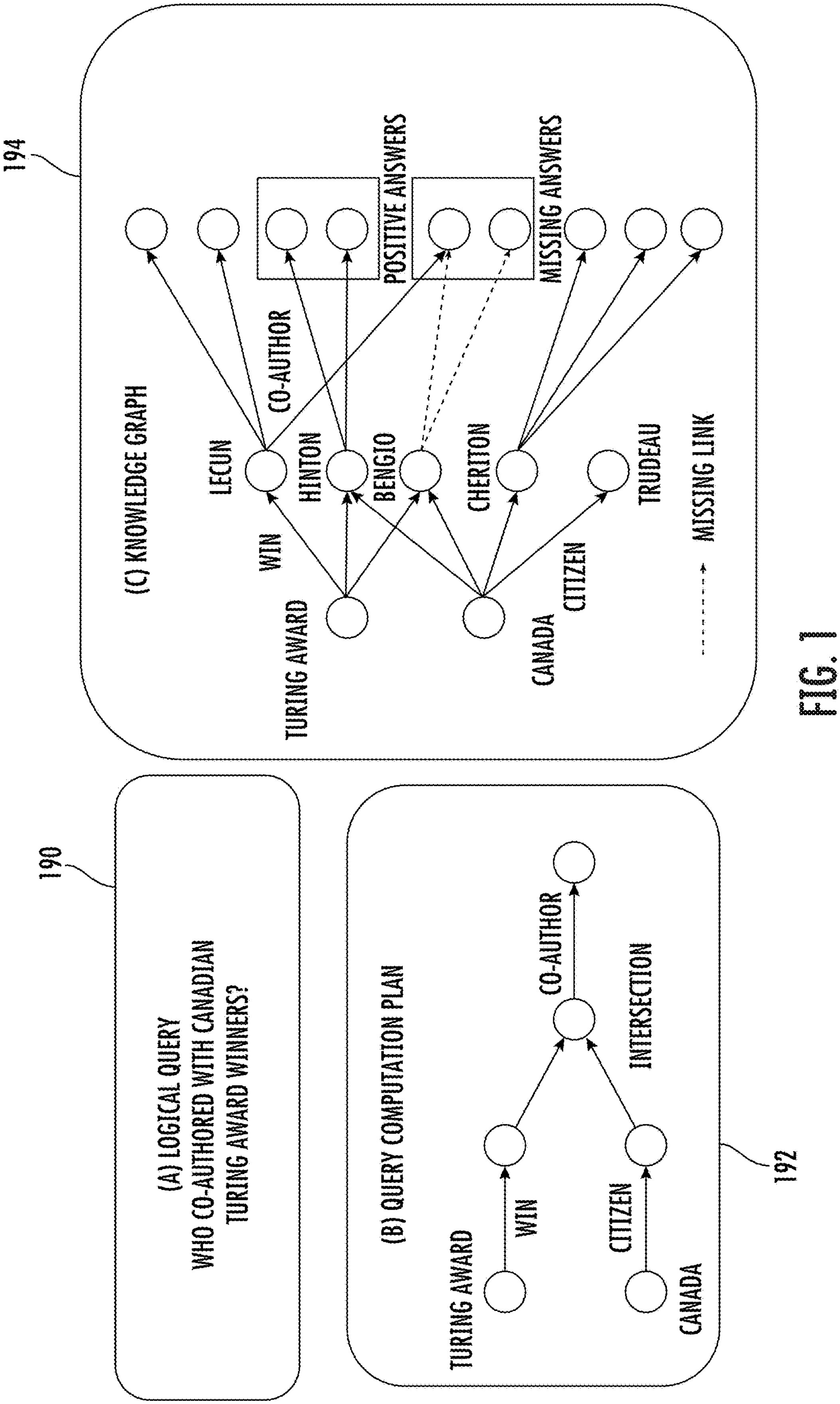
FIG. 1 depicts graphical diagrams of a multi-hop logical query and a corresponding query computation plan and knowledge graph according to example embodiments of the present disclosure.

Reference numerals that are repeated across plural figures are intended to identify the same features in various implementations.

DETAILED DESCRIPTION

Overview

Generally, the present disclosure is directed to systems and methods for scalable knowledge graph reasoning or query answering. Advantageously, systems and methods of the present disclosure provide for the first framework for both single-hop and multi-hop reasoning in knowledge graphs at scale.

Scaling up embedding-based multi-hop knowledge graph reasoning methods is necessary for many real-world artificial intelligence applications. Currently, there are no frameworks that support multi-hop reasoning on massive knowledge graphs. Prior approaches to knowledge graph reasoning have generally been unable to scale efficiently, especially for multi-hop reasoning. For instance, while there have been some scalable frameworks for single-hop knowledge graph completion, such frameworks generally cannot be directly used for multi-hop reasoning due to the more complex nature of the multi-hop reasoning task. Knowledge graph completion can be viewed as a case of a multi-hop reasoning task when the query consists of a single relation (e.g., (France, CapitalOf, ?). For example, multi-hop reasoning requires traversing multiple relations in the knowledge graph, which may span across multiple partitions. Embedding-based methods can solve both single-hop knowledge graph completion and multi-hop reasoning by first computing an embedding for each entity and relation and then using them to form predictions, however, existing scalable knowledge graph embedding frameworks only support single-hop knowledge graph completion and cannot be applied to the more challenging multi-hop reasoning task.

In contrast, systems and methods of the present disclosure can advantageously provide for multi-hop knowledge graph reasoning at scale. For instance, examples described herein include results processed over an example knowledge graph about 1,500 times larger than the largest knowledge graph previously considered for multi-hop reasoning and improve the worst-case runtime of enumerative search by four orders of magnitude. Furthermore, systems and methods of the present disclosure can advantageously provide a framework for single-hop and multi-hop knowledge graph reasoning at scale.

For example, the systems and methods of the present disclosure can perform algorithm-system co-optimization for scalability by efficiently generating training examples and operating on a full knowledge graph directly in a shared memory environment with multiple graphics processing units (GPUs). The training examples can be generated with a set of positive entities and a set of negative entities by instantiating a query on a given knowledge graph from a set of query logical structures. The root of the instantiated query can represent a known positive answer entity and negative non-answer entities can be obtained by using a bidirectional rejection sampling approach. Bidirectional rejection sampling can efficiently obtain high-quality negative entities for the instantiated query by identifying the optimal node cut of a query computation plan using dynamic programming, then simultaneously performing forward knowledge graph traversal and backward verification. The nodes in the optimal node cut cache the intermediate results from the forward knowledge graph traversal. For the backward verification, positive candidate entities and negative candidate entities can be proposed, then the knowledge graph can be traversed backwards to the optimal node cut and rejection sampling can be performed based on overlap of the forward set and the backwards set. As a result, the worst-case complexity is reduced by a square root, so a training query, a positive answer entity, and negative non-answer entities can be instantly generated.

The systems and methods of the present disclosure can operate on a full knowledge graph on a shared memory environment with multiple GPUs while storing embedding parameters in the CPU memory to overcome a limited GPU memory. For instance, an asynchronous scheduler can maximize the throughput of GPU computation by overlapping sampling, asynchronous embedding read and write, neural network feed-forward, and optimizer updates. As a result, an efficient implementation can be obtained that can achieve near linear speed-up with respect to the number of GPUs.

Example embodiments of the present disclosure provide a number of technical effects and benefits. For instance, more efficient processing at scale and improved utilization of processing resources can decrease computational costs (e.g., energy expenditure, etc.) associated with performing knowledge graph reasoning. For example, embodiments of the present disclosure can be deployed in a single-machine environment with a minimum requirement on the capacity of GPU memory, improve the worst-case runtime of enumerative search, and run more than twice as fast and with less GPU memory usage than existing multi-hop reasoning frameworks.

With reference now to the Figures, example embodiments of the present disclosure will be discussed in further detail.

Example Multi-Hop Reasoning on Knowledge Graphs

Query embedding methods aim to answer multi-hop logical queries by avoiding explicit knowledge graph traversal and executing the query directly in the embedding space by following a query computation plan, which can be robust against missing links. In multi-hop knowledge graph reasoning, one may need to predict one or many of the tail entities of a multi-hop logical query. Finding answers to the multi-hop logical query may require imputation and prediction of multiple edges across two parallel paths, while also using logical set operations, such as intersection and union. For instance, missing links typically need to be implicitly inferred in the knowledge graph in order to determine the entities that are the answer to a complex multi-hop query.

FIG. 1 depicts graphical diagrams of a multi-hop logical query and a corresponding query computation plan and knowledge graph according to example embodiments of the present disclosure. In the example of FIG. 1, a multi-hop logical query 190 may ask, "Who co-authored with Canadian Turing Award winners." In order to answer the multi-hop logical query 190, imputation and prediction of multiple edges across two parallel paths while using logical set operations may be used. Finding such answers to the multi-hop logical query 190 may be achieved by employing a query computation plan 192. The query computation plan 192 can provide a plan for executing the multi-hop logical query 190. For example, the query computation plan 192 may include a "Turing Award" entity and a "Canada" entity in two parallel paths, one path following the "win" relation and the other path following the "citizen" relation. In order to determine the entities that are the answer to the multi-hop query 190, missing links may need to be implicitly inferred in the knowledge graph 194. For example, the intersection logical set operation can be used to find the answer to the multi-hop query 190 of "Who co-authored with Canadian Turing Award winners" and the missing links may be implicitly inferred in the knowledge graph 194 in order to obtain the answer.

A knowledge graph $\mathcal{G}=(\mathcal{V}, \mathcal{E}, \mathcal{R})$ can consist of a set of nodes $\mathcal{V}$, edges $\mathcal{E}$, and relations $\mathcal{R}$. Each edge $e \in \mathcal{E}$ represents a triple $(v_h, r, v_t)$ where $r \in \mathcal{R}$ and $v_h, v_t \in \mathcal{V}$. Multi-hop reasoning queries can include relation traversals and logical operations, such as conjunction ($\wedge$), disjunction ($\vee$), existential quantification ($\exists$), and negation ($\neg$), as non-limiting examples. For example, first-order logical queries in disjunctive normal form may be used in some implementations. A first-order logical query q may consist of a non-variable anchor entity set $\mathcal{V}_q \subseteq \mathcal{V}$, existentially quantified bound variables $\mathcal{V}_1, \ldots, \mathcal{V}_k$, and a single target variable $\mathcal{V}_?$, which can represent the answer. The disjunctive normal form of a query q can be defined as: $q|V_?|=V_? \cdot \exists V_1, \ldots, V_k: c_1 \vee c_2 \vee \ldots \vee c_n$, where each c represents a conjunction of one or more literals e, $c_i=e_{i1} \wedge A\ e_{i2} \wedge \ldots \wedge e_{im}$, and each e represents an atomic formula or its negation, $e_{ij}=(v_a, V)$ or $\neg r(v_a, V)$ or $r(V', V)$ or $\neg r(V', V)$, where $v_a \in \mathcal{V}_q$, $V \in \{V_?, V_1, \ldots, V_k\}$, $V' \in \{V_1, \ldots, V_k\}$, $V \neq V'$, $r \in R$.

A query computation plan (e.g., query computation plan 192) can provide a plan for executing the query (e.g., multi-hop logical query 190). The query computation plan can consist of nodes $\mathcal{V}_q \bullet \{\mathcal{V}_1, \ldots, \mathcal{V}_k, \mathcal{V}_?\}$, where each node corresponds to a set of entities on the knowledge graph. The edges in the query computation plan can represent a logical or relational transformation of this set of entities, such as relation projection, intersection, union, complement, and negation, as non-limiting examples. For relation projection, given a set of entities $S \subseteq \mathcal{V}$ and relation type $r \in \mathcal{R}$, adjacent entities $\bullet_{v \in S} A_r(v)$ related to S via $r: A_r(v) \equiv \{v' \in \mathcal{V} : (v, r, v') \in \mathcal{E}\}$ can be computed. For intersection, given a set of entities $\{S_1, S_2, \ldots, S_n\}$, their intersection $$\bigcap_{i=1}^{n} S_i$$

can be computed. For complement or negation, given a set of entities $S \subseteq \mathcal{V}$, its complement $\overline{S}=\mathcal{V} \setminus S$ can be computed.

Traversing the Knowledge Graph Using the Query Computation Plan to Find Answers

A knowledge graph can be traversed using a query computation plan. For example, assuming no noise and no missing relations in the knowledge graph, a logical query (e.g., a first-order logical query) can be answered by traversing the edges of the knowledge graph. For a valid query, the query computation plan may be a tree structure, where the anchor entity set, $\mathcal{V}_q$, are the leaves and the target variable, $\mathcal{V}_?$, is the single root, representing the set of answer entities. Following the query computation plan, starting with the anchor entities, the knowledge graph can be traversed and logical operators can be executed towards the root node. The answers $$\mathcal{A}_q^{\mathcal{G}}$$

to the query q can be stored in the root node after traversing the knowledge graph. In such an example, there may be exponential computational complexity with respect to the number of hops and noisy or missing relations in the knowledge graph may not be handled, which are common in current applications of knowledge graphs.

Embedding-Based Traversal of the Knowledge Graph

Embedding-based reasoning methods avoid explicit knowledge graph traversal. Instead, embedding-based reasoning methods start with the embeddings of anchored entities and then apply a sequence of neural logical operators according to the query computation plan. As a result, the embedding of the query where each embedding-based logical operator can take the current input embedding and transform it into a new output embedding can be obtained. Then the logical operators can be combined according to the query structure. The answers to the query q may be the entities v that are embedded close to the final query embedding. The distance can be measured by a pre-defined function $\mathrm{Dist}(f_\theta(q), f_\theta(v))$, where $f_\theta(q)$ and $f_{74}$ (v) represent the query and the entity embedding, respectively. The distance function (Dist) may be tailored to different embedding spaces and model design $f_\theta$.

In order to perform logical reasoning in the embedding space, methods can design a projection operator $\mathcal{P}$ and intersection operator $\mathcal{I}$. $\mathcal{P}$ can represent a mapping from a set of entities (represented by an embedding) to another set of entities (also represented by an embedding) with one relation (i.e., $\mathcal{P}: \mathbb{R}^d \times \mathcal{R} \rightarrow \mathbb{R}^d$), assuming the embedding dimension is d. The $\mathcal{I}$ can take as input multiple embeddings and output the embedding that represents the intersected set of entities: $\mathcal{I}: \mathbb{R}^d \times \ldots \times \mathbb{R}^d \rightarrow \mathbb{R}^d$. Different models may have different instantiations of these two operators.

Contrastive Learning for Knowledge Graph Embeddings

During training, a data sampler $\mathcal{D}$ can be given, where each sample in $\mathcal{D}$ is a tuple $$(q, \mathcal{A}_q^{\mathcal{G}}, \mathcal{N}_q^{\mathcal{G}}),$$

which represents a query q, the query's answer entities $$\mathcal{A}_q^{\mathcal{G}} \subseteq \mathcal{V},$$

and the negative samples $$\mathcal{N}_q^{\mathcal{G}} \subseteq \mathcal{A}_q^{\mathcal{G}}.$$

The contrastive loss equation (1) is designed to minimize the distance between the query embedding and the query embedding's answers $$Dist(f_\theta(q), f_\theta(v)),\ v \in \mathcal{A}_q^{\mathcal{G}}$$

while maximizing the distance between the query embedding and the negative samples $$Dist(f_\theta(q), f_\theta(v')),\ v' \in \mathcal{N}_q^{\mathcal{G}},$$

$$\mathcal{L}(\theta) = -\frac{1}{|\mathcal{A}|}\sum_{v\in\mathcal{A}_q^{\mathcal{G}}} \log\sigma(\gamma - Dist(f_\theta(q), f_\theta(v))) - \frac{1}{|\mathcal{N}|}\sum_{v'\in\mathcal{N}_q^{\mathcal{G}}} \log\sigma(Dist(f_\theta(q), f_\theta(v')) - \gamma)$$

where $\gamma$ is a hyperparameter that defines the margin and $\sigma$ is the sigmoid function. (1) This is referred to herein as the contrastive loss equation (1).

Identifying or computing $$\mathcal{A}_q^{\mathcal{G}} \text{ and } \mathcal{N}_q^{\mathcal{G}}$$

can involve complex first-order logical operations due to the multi-hop structure in reasoning, which are more expensive than sampling in classical, single-link knowledge graph completion tasks, and is therefore a bottleneck for scaling-up. The systems and methods of the present disclosure can scale up single-hop and multi-hop knowledge graph reasoning methods with an efficient sampling algorithm and parallel training for a given contrastive loss.

Example Method for Negative Sampling

Sampling training data for multi-hop reasoning is more complicated than in link prediction, where sampling the training data (head-relation-tail triple) can be quickly performed by dictionary lookup. For instance, sampling training data for multi-hop reasoning may involve generating queries q by instantiating query structures and performing knowledge graph traversal to find answers $$\mathcal{A}_q^{\mathcal{G}}$$

and negative non-answers $$\mathcal{N}_q^{\mathcal{G}},$$

which can be computationally expensive. The systems and methods of the present disclosure can provide an efficient technique to sample training data for contrastive learning for multi-hop reasoning. In some implementations, during inference, there may be a pre-generated test set or a user can input a test query of interest.

A knowledge graph with entities or nodes and links or edges between the entities that describe the relation between the entities can be obtained. The knowledge graph may be a heterogeneous graph. A query structure (also referred to as a query computation graph or query computation plan) can be generated based on the knowledge graph. The query structure can contain nodes and edges, and the nodes can include anchor nodes, a root node, and intermediate nodes in the paths between the anchor nodes and the root node, such as in implementations where the query structure is a tree structure.

A node cut of the query structure can be determined. The node cut can correspond to a query of the query structure. The node cut can include at least one node that cuts at least one path between each anchor node and the root node of the query structure. In order to efficiently identify negative samples for the query structure, bidirectional rejection sampling can be used to bidirectionally traverse the query structure in a first direction from the anchor nodes to the node cut and in a second direction from the root node to the node cut. During the traversal in the first direction from the anchor nodes to the node cut, the intermediate nodes obtained while traversing can be cached.

Figure 2:
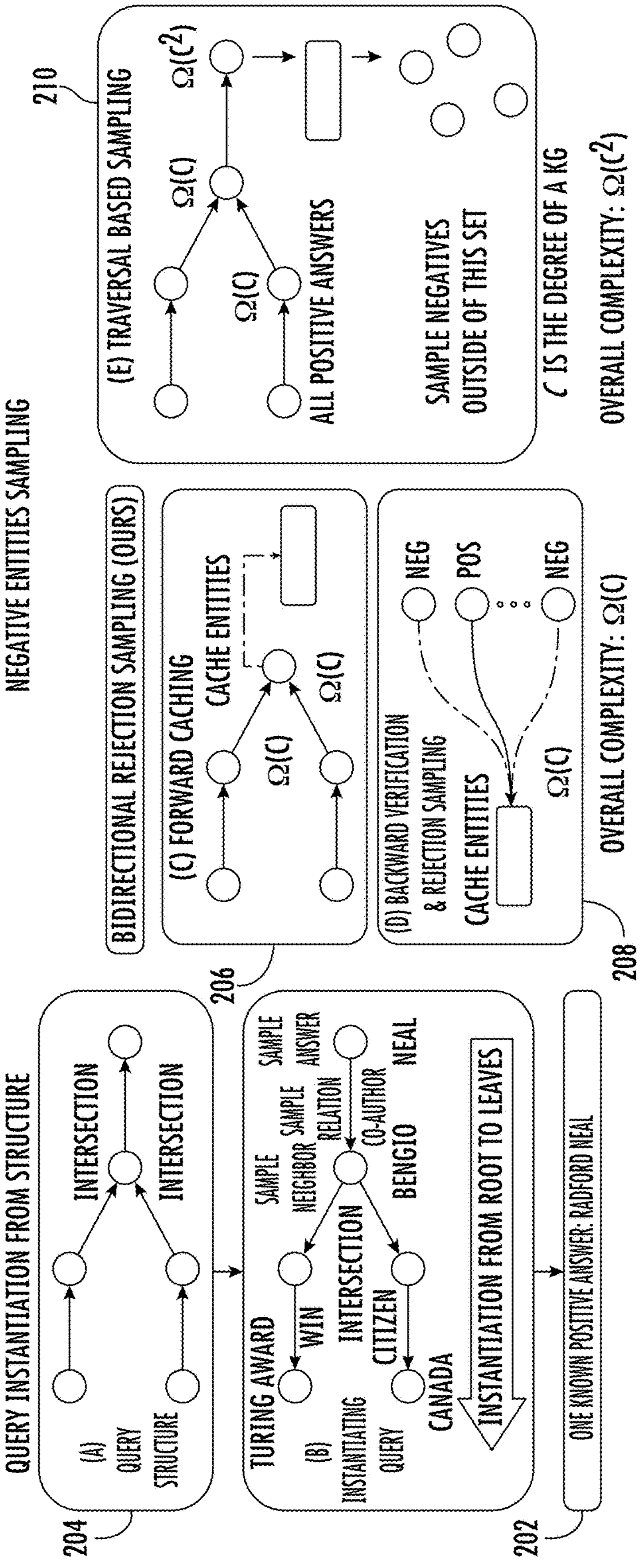
FIG. 2 depicts graphical diagrams of query instantiation from a query structure and negative entities sampling according to example embodiments of the present disclosure.

FIG. 2 depicts graphical diagrams of query instantiation from a query structure and negative entities sampling according to example embodiments of the present disclosure. In the example of FIG. 2, queries can be instantiated using query structures from root to leaves. The entity in the root can become a positive answer to the instantiated query. For negative entities, bidirectional rejection sampling can be performed, which may have a square root computation complexity compared to the traversal-based method.

In order to generate a training example with a set of positive and negative entities, first, a query is instantiated 202 on a given knowledge graph from a set of query structures, such as query structure 204. The root of the instantiated query 202 can represent a known positive answer entity (e.g., one known positive answer: Radford Neal in the instantiated query 202). Negative non-answer entities for the instantiated query 202 can be obtained by using a bidirectional rejection sampling approach. The optimal node cut (e.g., the node after the intersection in the forward knowledge graph traversal 206 of the bidirectional rejection sampling) of the query computation plan can be identified by using dynamic programming. Forward knowledge graph traversal 206 and backward verification 208 can then be performed simultaneously. The nodes in the optimal node cut can cache the intermediate results from the forward knowledge graph traversal 206. For the backward verification 208, positive candidate entities and negative candidate entities can be proposed, the knowledge graph can be traversed backwards to the optimal node cut, and rejection sampling can be performed based on overlap between the forward traversal set and the backward traversal set. As a result, the worst-case complexity is reduced by a square root 210, so a training query, a positive answer entity, and negative non-answer entities can be instantly generated. The overlap of the cached intermediate nodes and the nodes traversed while traversing in the second direction from the root node to the node cut can be determined, where a node is a negative non-answer when there is no overlap between the cached intermediate nodes and the traversed nodes. In some implementations, the overlap between negative candidate entities and the cached intermediate nodes can be determined.

A node cut $c_q$ of a query q can be a set of nodes in the query computation plan, such that every path between anchor node (leaf) and answer node (root) contains one node in $c_q$. By definition, a node cut is minimal, meaning that no subset of $c_q$ can be a node cut. For example, in the example of FIG. 2, given a two-hop query, “Who co-authored papers with Canadian Turing Award winners,” the node after the intersection operation (e.g., the “Bengio” node in the instantiated query 202) can be set as the single node in the node cut. Then, the set of “Canadian Turing Award winners” can be obtained by forward knowledge graph traversal 206 caching the intermediate results (e.g., “Bengio”). Overall, the process can take O(C) computation or memory cost, where C is the degree of the knowledge graph. Given a candidate negative entity v, the cost can be O(C) to verify whether the set of co-authors of v overlaps with the cached entities in the node cut. For example, a constant number of candidate negative entities can be used, resulting in an overall computation cost of O(C), which is a reduction of square root from $O(C^2)$ using exhaustive traversal.

The computation cost for any given node cut $c_q$ can be calculated. An efficient algorithm can be used to then find the optimal node cut, which may be the node cut with the lowest cost in bidirectional search. Computation costs for the node cuts can be based on paths between each anchor node and the root node. To calculate the computation costs, a maximum number of relation projections in the paths between each anchor node and the root node, a length of a path from each anchor node to the anchor nodes where the length of the path is a number of relation projections on the path, and the optimal costs of resolving the paths between each anchor node and the root node can be determined.

Given a reasoning path $P_{(v_a,V_?)}=[v_0=v_a, v_1, \ldots, v_t=V_?]$ in the query computation plan that starts from an anchor node (i.e., leaf) $v_a \in \mathcal{V}_q$ and ends at the answer node (i.e., root) $\mathcal{V}_?$, for a node cut $c_q$, by definition there exists a unique node $v_i \in c_q \cap P_{(v_a,V_?)}$. Then, the worst-case computation or memory cost for negative sampling for reasoning path $P_{(v_a,V_?)}$ can be estimated as cost $(c_q, P_{(v_a,V_?)})$-max $\{C^i, C^{t-i}\}$ (i.e., the maximum cost of forward traversal or backward verification). The optimal scheduling can be recast as $$\min_{c_q} \max_{v_a \in \mathcal{V}_q} \text{cost}\left(c_q, P_{(v_a,V_?)}\right), \text{ s.t. } c_q \text{ is a node cut of } q \qquad (2)$$

This is referred to herein as the optimization problem (2).

The optimization problem (2) can be solved with dynamic programming, for instance when the query computation plan is a tree. The relation projection operation can enlarge the current set of entities by a factor of C, which is the maximum node degree, in the worst case, so the total cost grows exponentially with the number of relation projection operations in a reasoning path. For the intersection and union operations, if the set of entities is a sorted list, then intersection or union of the two sets takes linear time with respect to the number of entities in both sets, so it is not a limiting factor in the overall computation cost if a constant number of sets is merged together. For the negation and complement operations, the computation cost of a single set complement operation is $\mathcal{O}(|\mathcal{V}|)$ (i.e., the total number of entities in the knowledge graph). The complement operation can be delayed to the next step on the query computation plan (i.e., perform complement and union or intersection simultaneously), which reduces the complexity from $\mathcal{O}(\mathcal{V})$ to that of an intersection operation. For example, in (¬a)∧b, instead of first finding the complement of a (of complexity $|\mathcal{O}(\mathcal{V})|$) and then doing ∧ (of complexity $\mathcal{O}|\mathcal{V}-a|+|b|$), the set difference b−a (of complexity $\mathcal{O}|a|+|b|$) can be done. The focus is the maximum number of relation projections in any reasoning path (i.e., a path that connects a leaf/anchor entity $v \in \mathcal{V}_q$ and the root/answer entity $\mathcal{V}_?$).

Three functions can be defined, u(v), s(v), o(v), which represent the number of relation projections from v to the root $\mathcal{V}_?$, the maximum length of path from v to any anchors where the length is measured by the number of relation projections on that path, and the optimal cost of resolving all the reasoning paths that include v in the best plan, respectively. The dependency of the three functions can be derived recursively, the dynamic program can be solved in a linear time with respect to |q|, and the node cut can be constructed using the function o(·).

For the dynamic programming, the parent of node v can be denoted p(v) and the set of children nodes can be denoted ch(v). When v has only one child node, then ch(v) can be overloaded to denote that specific child. The recursion can be taken as:

$$u(v) = u(p(v)) + IsRel(v \to p(v))$$

$$s(v) = \begin{cases} 0, \text{ if } v \in \mathcal{V}_q \\ \max_{z \in ch(v)} s(v), \text{ if edges between } v \text{ and } ch(v) \text{ are } \wedge \text{ or } \vee \\ s(ch(v)) + NotNeg(ch(v) \to v), \text{ else} \end{cases}$$

$$o(v) = \begin{cases} u(v), \text{ if } v \in \mathcal{V}_q \\ \min\{\max_{z \in ch(v)} o(z), \max\{u(v), s(v)\}\}, \text{ else} \end{cases}$$

IsRel(v→p(v)) returns 1 if the edge between v and p(v) represents a relation projection and 0 otherwise; NotNeg(ch(v)→v) returns 1 if the edge between ch(v) and v is not negation and 0 otherwise.

After solving the dynamic programming recursion, the node cut can be constructed from solution o(·) in a top-down direction: If for any node v there is $\max_{z \in ch(v)} o(z)$ larger than max{u(v),s(v)}, then add v to the node cut; otherwise, do the check recursively for $z \in ch(v)$.

Figure 3:
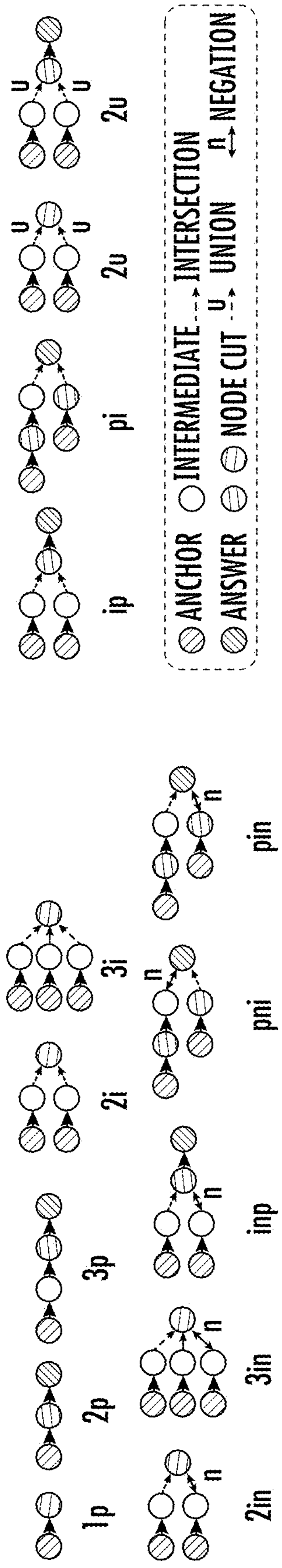
FIG. 3 depicts graphical diagrams of query logical structures according to example embodiments of the present disclosure.

FIG. 3 depicts graphical diagrams of query logical structures according to example embodiments of the present disclosure. In the example of FIG. 3, the optimal node cuts of the example query structures and the anchor entities $\mathcal{V}_q$ in the example query structures are represented, showing that different query structures can have different optimal node cuts. The example query structures and the optimal node cuts of the example query structures can be used by the bidirectional rejection sampling of the present disclosure.

Instantiating a Query Structure

A query logical structure (e.g., example query logical structure of FIG. 3) can specify the backbone of a query q, including the types of operation (e.g., intersection, relation projection, negation, and union, as non-limiting examples) and the structure of the query. The query logical structure can be viewed as an abstraction of the query computation plan, where anchor nodes and relation types may not be grounded. Instantiating a query is a way to construct a concrete query given the logical structure of the query. Instantiating a query structure involves specifying a relation $r \in \mathcal{R}$ for each edge in the structure and the anchor entities $\mathcal{V}_q$.

Current methods to instantiate a query include first grounding the anchor entities by randomly sampling entities in the knowledge graph and then randomly selecting relations $r \in \mathcal{R}$ for all the relation projection edges. In most cases, randomly generated queries do not have answers in the knowledge graph because sampled entities may not have relations of predetermined types and intersections of random entities will almost always be empty, therefore such samples are rejected and the sampling process is restarted, which leads to high computation costs.

The systems and methods of the present disclosure allow for instantiating a query logical structure by using reverse directional sampling to construct queries from a knowledge graph, which reduces computation cost compared to current methods. For example, first the root node (i.e., the answer node) of the query structure may be grounded, then the query structure can be processed towards the anchor nodes. The overall instantiation process corresponds to a depth-first search where at each step a node/edge on the query structure can be grounded with an entity/relation from the knowledge graph.

Reverse directional sampling can use depth-first search over the query structure from the root (i.e., the answer node) to the leaves (i.e., the anchor nodes). During the depth-first search, each node on the query structure can be grounded to an entity on the knowledge graph and an edge of the query structure can be grounded to a relation on the knowledge graph associated with the previously grounded entity. Reverse directional sampling can return the instantiated query q, the anchor entities $\mathcal{V}_q$, and a single positive answer $$a \in \mathcal{A}_q^{\mathcal{G}}$$

which is the instantiated entity at the root.

For example, in the instantiated query 202 example of FIG. 2, the query structure root is "Neal," which can be a positive answer. During depth-first search, instantiation starts at the root node "Neal." An entity from the knowledge graph can be randomly sampled, such as the "Neal" entity. Then, following the query structure, the edge that points to the root "Neal" in the query structure can be grounded (e.g., "Co-author") and a relation type from the knowledge graph that points to the entity "Neal" can be sampled. Then, the next node which has the relation "Co-author" with "Neal" (e.g., "Bengio") can be grounded to an entity on the knowledge graph. Because the edge can be a logical operation of intersection, the next node can be directly grounded with the same entity (e.g., "Bengio") and another relation on the knowledge graph that relates to "Bengio" can be grounded (e.g., "Win"), until finally reaching the anchor entity (leaf) by sampling an entity on the knowledge graph that has the relation "Win" with "Bengio" (e.g., "Turing Award"). The instantiated query, the anchor entities (the leaves "Turing Award" and "Canada"), and a positive answer (the root "Neal") can be returned.

Reverse directional sampling can obtain valid queries with a non-empty answer set and the overall complexity can be $O(C^{|q|})$, which is the same as the complexity of depth-first search, where $|q|$ indicates the maximum depth of a path from the root to the leaves in the query structure, and C is the maximum degree of entities in the knowledge graph.

Negative Sampling

After instantiating the query structure by grounding the nodes and edges of the query structure, the tuple $(q, \mathcal{V}_q, \{a_q\})$ can be obtained as a positive sample. The negative non-answer entities $$\mathcal{N}_q^{\mathcal{G}}$$

should then be determined in order to optimize the contrastive loss equation (1). A single answer entity can be sufficient in each step of stochastic training, while $$k = |\mathcal{N}_q^{\mathcal{G}}|$$

in the contrastive loss equation (1) may be thousands for negative samples in the contrastive learning objective. The set of negative non-answer entities, $$\mathcal{N}_q^{\mathcal{G}},$$

can be determined by using bidirectional rejection sampling.

Current methods may sample negative entities (i.e., non-answers) at random from a knowledge graph, independent of the query q. A valid query may have many answer entities in the order of $O(C^{|q|})$, so many of the sampled negatives are actually answers to the query, which can lead to noisy training data that can confuse the model. An alternative method may be to execute the query q and perform knowledge graph traversal to obtain all the answers $$\mathcal{A}_q^{\mathcal{G}}$$

and then obtain negative samples $$\mathcal{N}_q^{\mathcal{G}}$$

by sampling from $$\mathcal{V} \backslash \mathcal{A}_q^{\mathcal{G}},$$

however, $$|\mathcal{A}_q^{\mathcal{G}}|$$

is still in the order of $O(C^{|q|})$, even with re-ordering of the relation projection operations to get better scheduling. Such exhaustive traversal may be prohibitive for negative sampling on large knowledge graphs.

The systems and methods of the present disclosure can instead perform bidirectional sampling in order to efficiently obtain negative non-answer entities $$\mathcal{N}_q^{\mathcal{G}}$$

on large knowledge graphs. Rejection sampling can be used to locate a subset of negative entities efficiently, as $$\mathcal{N}_q^{\mathcal{G}}$$

does not need to contain all of the non-answer entities during stochastic training. Starting with a random proposal $v \in \mathcal{V}$, it should be determined whether $$v \in \mathcal{A}_q^{\mathcal{G}},$$

rather than to enumerate the entire $$\mathcal{A}_q^{\mathcal{G}}.$$

A node cut can be obtained on the query computation plan (i.e., a subset of nodes that cut all the paths between each leaf node and the root node), then bidirectional search can be performed. The traversal of the query computation plan can be started from the leaves (i.e., the anchor nodes) to the node cut, and the entities obtained in traversal can be cached (e.g., forward caching the intermediate results from the forward knowledge graph traversal 206). Then, negative entities can be sampled, traversal from the root to the node cut can be performed, and whether the sample negative entities are true negatives can be verified by checking the overlap of the cached entities and the traversed set (e.g., backward verification 208).

Example Training System

The full knowledge graph can be operated on directly in a shared memory environment with multiple GPUs, while storing embedding parameters in the CPU memory to overcome the limited GPU memory. The usage of CPU and GPU can be combined, where the dense matrix computations can be deployed on GPUs and the sampling operations can be deployed on CPUs. As a result, the potential drawbacks of graph partitioning for multi-hop reasoning in current knowledge graph embedding systems can be avoided. An asynchronous scheduler can be used to maximize the throughput of GPU computation by overlapping sampling, asynchronous embedding read/write, neural network feed-forward, and optimizer updates. As a result, an efficient implementation can be obtained that can achieve near linear speed-up with respect to the number of GPUs.

Distributed Training Paradigm

Most of the knowledge graph embedding methods would maintain an embedding matrix $\theta_E \in \mathbb{R}^{|\mathcal{V}| \times d}$, where d is the embedding dimension, which can typically be 512 or larger. For a large knowledge graph with more than millions of entities, the embeddings $\theta_E$ cannot be stored in GPUs because most GPUs would have a memory of 16 GB or less. Instead, the embedding matrix can be put on shared CPU memory, while putting a copy of other parameters $\theta_D = \theta \backslash \theta_E$, for example neural logical operators, in each individual GPU.

Figure 4:
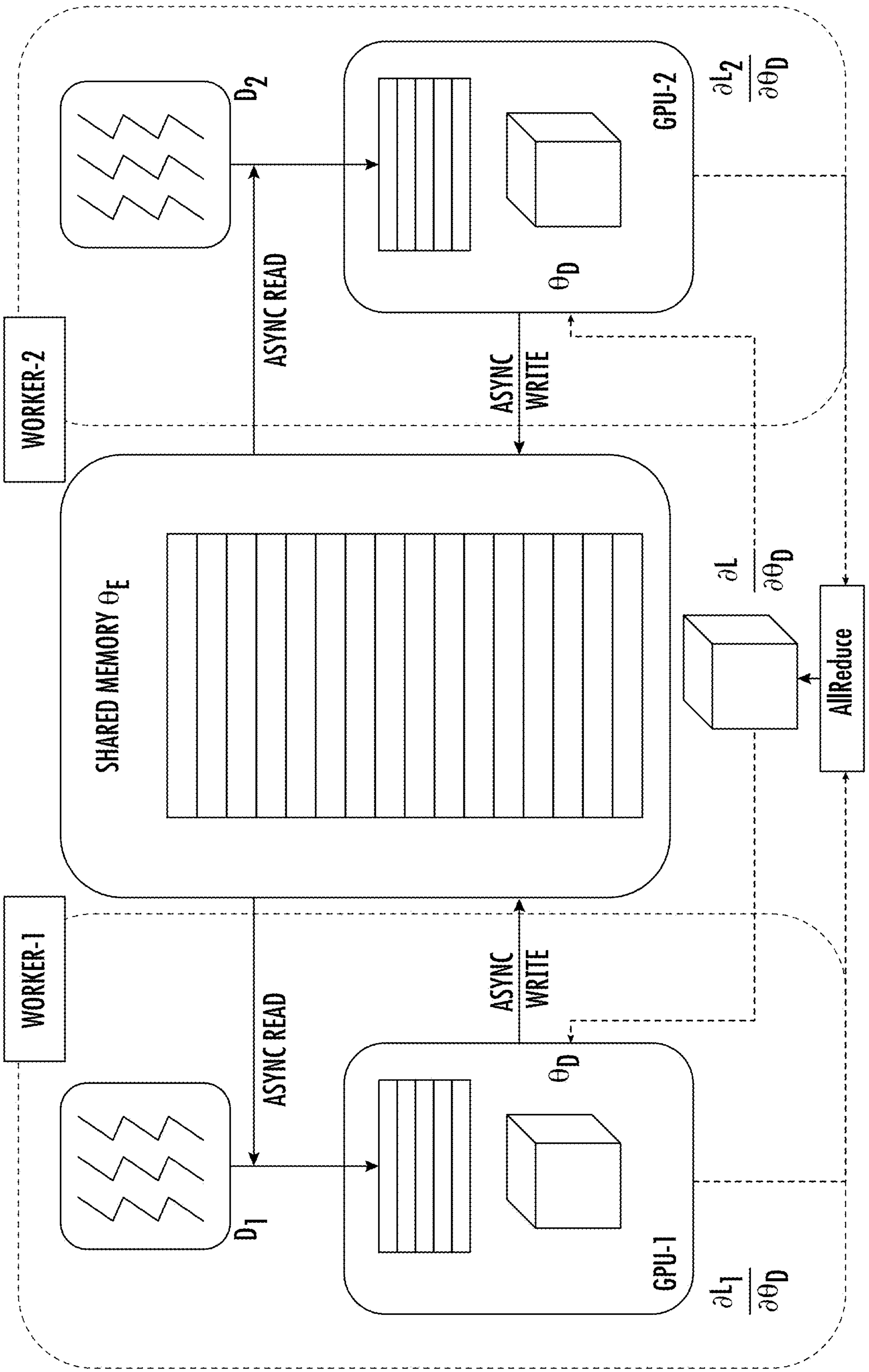
FIG. 4 depicts a diagram of a training computing system according to example embodiments of the present disclosure.

FIG. 4 depicts a diagram of a training computing system according to example embodiments of the present disclosure. One worker process can be launched per GPU device, where w denotes an index of a worker process. Worker w gets the shared access to $\theta_E$ and local GPU copy of dense parameters $\theta_D$. Each worker w repeats the following steps until training stops:

1. Collect a mini-batch of training samples $\{D_i\}_w$ from $\mathcal{D}_w$, which is the sampler.
2. Load relevant entity embeddings from CPU to GPU.
3. Compute gradients locally and perform gradient All-Reduce using $$\frac{\partial \mathcal{L}_w}{\partial \theta_D}.$$

Update local copy $\theta_D$.

4. Update shared $\theta_E$ asynchronously with $$\frac{\partial \mathcal{L}_w}{\partial \theta_E}.$$

In the shared memory with multiple GPU scenario, the heavy CPU/GPU memory read/write with $\theta_E$ is necessary for every round of stochastic gradient update, which significantly lowers the FLOPS (Floating Point Operations Per Second) on GPU devices if the above steps are executed in a serialized manner. Instead, an asynchronous pipeline design can be used.

The different storage location of parameters also brings different read/update mechanisms. For the embedding parameters $\theta_E$, because only a small portion may be accessed during each iteration in stochastic training, the asynchronous update on the shared CPU memory can still result in a convergent behavior. Unlike link prediction models, most multi-hop reasoning models are additionally equipped with dense neural logical operators, which can be used in all batches and iterations. In order to minimize the loss of performance of multi-GPU training of these dense parameters, $\theta_D$ can be synchronously updated with AllReduce operations that are available in a multi-GPU environment with the NVIDIA Collective Communication Library (NCCL).

Asynchronous Pipeline Design

Figure 5:
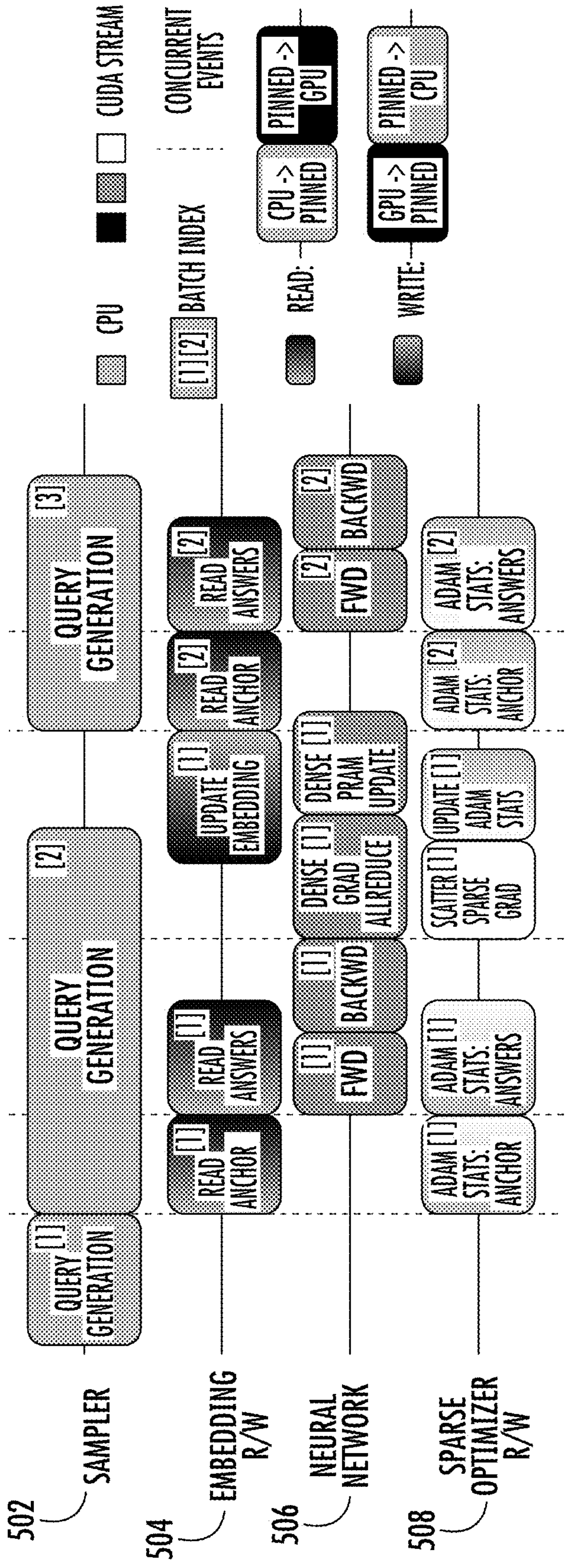
FIG. 5 depicts a sequence diagram of a worker process of a training computing system according to example embodiments of the present disclosure.

FIG. 5 depicts a sequence diagram of a worker process of a training computing system according to example embodiments of the present disclosure. FIG. 5 shows the overlapping sampling, asynchronous embedding read/write, neural network feed-forward, and optimizer updates of the asynchronous scheduler that can be used to maximize the throughput of GPU computation.

An asynchronous mechanism for pipelining the stages in each stochastic gradient update can be employed. The stages can be virtually categorized into four kinds of meta-threads, where each kind of meta-thread may consist of multiple CPU threads or CUDA streams. These meta-threads can run concurrently, with possible synchronization events for pending resources.

In the example of FIG. 5, one meta-thread example is sampler 502, which can be a multi-thread sampler. Each worker w can maintain one sampler $\mathcal{D}_w$ that has access to the shared knowledge graph. The sampler can container a thread pool for sampling queries and the corresponding positive/negative answers in parallel. The data sampler can work concurrently with the other meta-threads (e.g., embedding read/write 504, neural network 506, sparse optimizer read/write 508). The pre-fetching mechanism can obtain samples for the next mini-batch while training happens using current batch on other threads, so if the sampler is efficient enough, then the runtime can almost be ignored.

In the example of FIG. 5, one meta-thread example is an embedding read/write 504, such as a sparse embedding read/write. For the embedding matrix OF, a single background thread can be created with a CUDA stream for embedding read and write. In particular, when loading the embedding of some entities into GPU, the background thread may first load that into a pinned memory area, then the CUDA asynchronous stream can perform pinned memory to GPU memory copy. This read operator may be non-blocking and may not be synchronized until the CUDA operator in the main CUDA stream asks for it. The write operation can work similarly but in the reverse direction. In some implementations, there may be multiple background threads.

In the example of FIG. 5, one meta-thread example is a neural network 506, such as neural network feed-forward. The feed-forward model $f_\theta$ can start when training data $$(q, \mathcal{V}_q, \mathcal{A}_q^{\mathcal{G}}, \mathcal{N}_q^{\mathcal{G}})$$

is ready and the embedding of the anchor entities $\mathcal{V}_q$ is fetched into GPU. The embeddings of $$\mathcal{A}_q^{\mathcal{G}} \text{ and } \mathcal{N}_q^{\mathcal{G}}$$

can be fetched as late as when the loss function is computed in order to overlap the computation and memory copy. After obtaining the local gradients $$\frac{\partial \mathcal{L}_w}{\partial \theta_E} \text{ and } \frac{\partial \mathcal{L}_w}{\partial \theta_D},$$

the asynchronous update for $\theta_E$ can be invoked first without blocking, and at the same time the AllReduce operation can start, followed by the dense parameter update of $\theta_D$ on the GPU.

In the example of FIG. 5, one meta-thread example is a sparse optimizer read/write 508, such as a sparse optimizer with asynchronous read/write. Unlike with $\theta_p$, only a small set of rows of $\theta_E$ may be involved in each stochastic update. Thus, $$\theta_E^{\mathcal{V}_q}, \theta_E^{\mathcal{N}_q^{\mathcal{G}}}, \theta_E^{\mathcal{A}_q^{\mathcal{G}}}$$

and their gradients may be tracked (i.e., the embeddings that are relevant to positive entities, negative entities, and anchor entities. After the back-propagation is finished, $$\frac{\partial \mathcal{L}_w}{\partial \theta_E^{\mathcal{V}_q}}, \frac{\partial \mathcal{L}_w}{\partial \theta_E^{\mathcal{N}_q^{\mathcal{G}}}}, \text{ and } \frac{\partial \mathcal{L}_w}{\partial \theta_E^{\mathcal{A}_q^{\mathcal{G}}}}$$

can be scattered into a single contiguous memory, due to the potential overlap among the sets $$\mathcal{V}_q, \mathcal{N}_q^{\mathcal{G}}, \text{ and } \mathcal{A}_q^{\mathcal{G}}.$$

The first and second order moments of gradients may also be in CPU and treated in the same manner as $\theta_E$, and thus may have the same asynchronous read/write behavior as discussed above. When a set of embeddings can be retrieved from $\theta_E$, the optimizer can also start to pre-fetch the corresponding first/second order moments in a different background thread.

Additional Optimization

Additional optimization can further speed up training. For example, although with the asynchronous design the embedding read/write can overlap with GPU computation, the size of the memory exchange should be small. The negative answers can be shared among the queries in a mini-batch. Each mini-batch data can be formatted as $$(\mathcal{N}, \{(q_i, \mathcal{V}_{qi}, \mathcal{A}_{qi})\}_{i=1}^{M}, \text{Mask}),$$

where $\mathcal{N} \subset \mathcal{V}$ are the shared negative answers for all queries. Mask$\in \{0,1\}^{M\times|\mathcal{N}|}$ is an indicator matrix. Mask$_{i,j}$ specifies whether the j-th entry in $\mathcal{N}$ is a negative sample for $q_i$. This sharing also favors the bidirectional rejection sampler, as it is the sample-and-check process, with the adaptation that all the queries in the same mini-batch share the support of negative sampling proposal.

The computation among worker processes can be balanced since there is the synchronized gradient update for $\theta_D$ at each step. For example, with the query tree structures sampled in each mini-batch, some of the simple structures like 1-hop question can be computed very fast, which others, such as conjunctions with negations, need not only multi-hop computation, but also involve dense neural network calculation. In order to balance the workload, the sampler $\mathcal{D}_w$ of each worker w can sample queries of the same structure in each mini-batch by synchronizing the random seed at the beginning, while not making the actual instantiated query the same.

Example Methods

Figure 6:
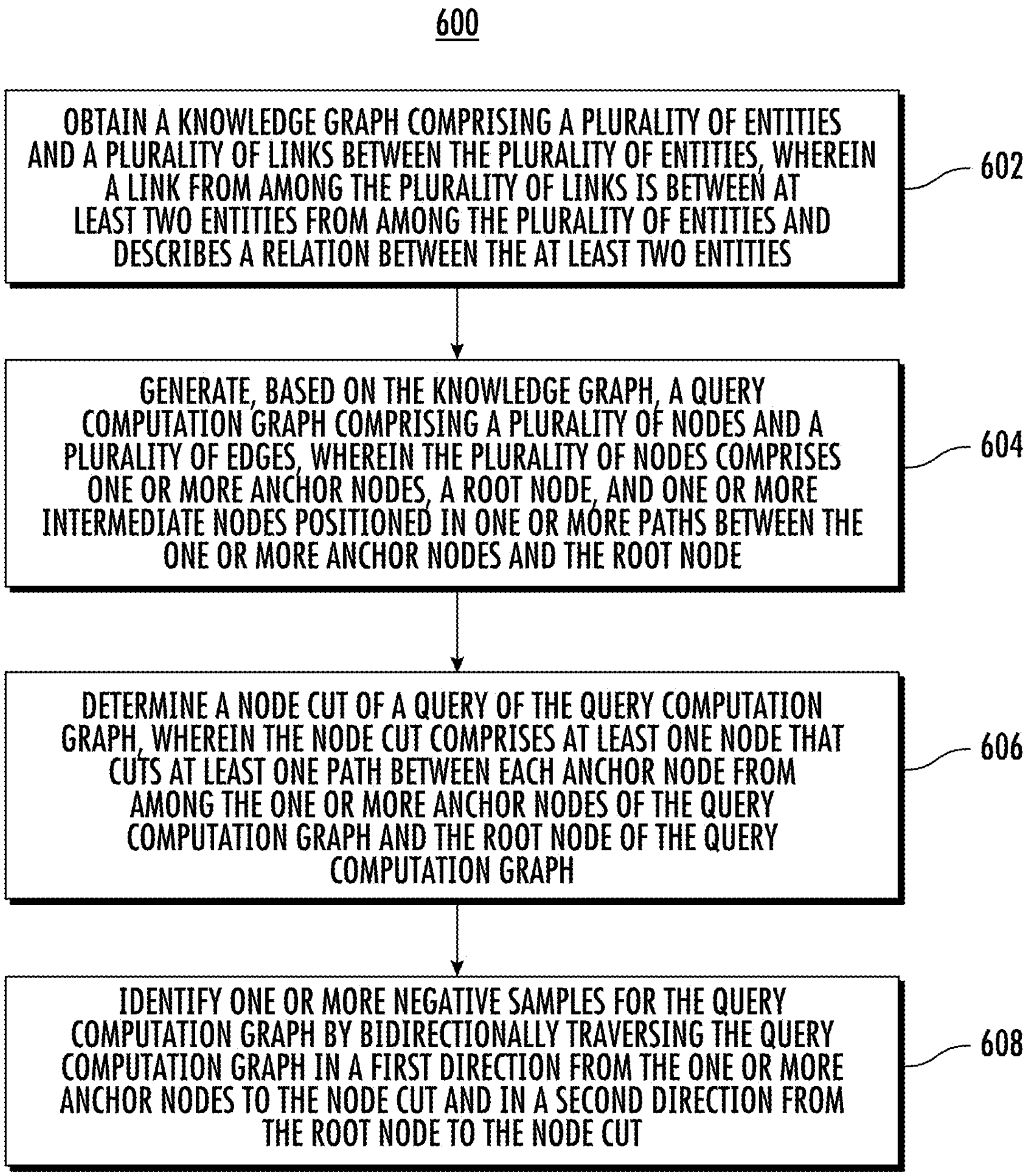
FIG. 6 depicts a flow chart diagram of an example method for negative sampling with improved efficiency according to example embodiments of the present disclosure.

FIG. 6 depicts a flow chart diagram of an example method 600 for negative sampling with improved efficiency according to example embodiments of the present disclosure.

At 602, a computing system obtains a knowledge graph comprising a plurality of entities and a plurality of links between the plurality of entities, wherein a link from among the plurality of links is between at least two entities from among the plurality of entities and describes a relation between the at least two entities. For example, the knowledge graph can be a heterogeneous graph.

At 604, the computing system generates, based on the knowledge graph, a query computation graph comprising a plurality of nodes and a plurality of edges, wherein the plurality of nodes comprises one or more anchor nodes, a root node, and one or more intermediate nodes positioned in one or more paths between the one or more anchor nodes and the root node. For example, the query computation graph can be a plan for executing a query, and the query can be executed in an embedding space. Each node from among the plurality of nodes of the query computation graph can correspond to a set of entities on the knowledge graph, and the plurality of edges of the query computation graph can represent a logical relational transformation of the set of entities on the knowledge graph, wherein the logical relational transformation of the set of entities on the knowledge graph can include one or more of relation projection, intersection, union, complement, and negation. In some implementations, a depth-first search over the query computation graph from the root node of the query computation graph to the one or more anchor nodes of the query computation graph can be performed, wherein each node of the query computation graph is grounded to an entity on the knowledge graph and an edge of the query computation graph is grounded to a relation on the knowledge graph associated with a previously grounded entity on the knowledge graph. The root node of the query computation graph may be a known positive answer to the query.

At 606, the computing system determines a node cut of a query of the query computation graph, wherein the node cut comprises at least one node that cuts at least one path between each anchor node from among the one or more anchor nodes of the query computation graph and the root node of the query computation graph. For example, the query can be a first-order logical query. In some implementations, the computing system can calculate computation costs for one or more node cuts based on paths between each anchor node from among the one or more anchor nodes of the query computation graph and the root node of the query computation graph, and the node cut can be one of the node cuts with a lowest computation cost. In some implementations, the computation costs for the one or more node cuts can include determining a maximum number of relation projections in the paths between each anchor node from among the one or more anchor nodes of the query computation graph and the root node of the query computation graph, determining a length of a path from each anchor node to the anchor nodes where the length of the path is the number of relation projections on the path, and determining optimal costs of resolving the paths between each anchor node from among the one or more anchor nodes of the query computation graph and the root node of the query computation graph.

At 608, the computing system identifies one or more negative samples for the query computation graph by bidirectionally traversing the query computation graph in a first direction from the one or more anchor nodes to the node cut and in a second direction from the root node to the node cut. In some implementations, traversing the query computation graph in the first direction from the one or more anchor nodes to the node cut can include caching the one or more intermediate nodes, wherein the intermediate nodes are obtained while traversing the query computation graph in the first direction, comparing overlap of the cached one or more intermediate nodes and a set of nodes traversed while traversing the query computation graph in the second direction from the root node to the node cut, and determining, based on the overlap, that a node from among the set of nodes traversed is a negative non-answer to the query, wherein a negative sample comprises the negative non-answer to the query. In some implementations, traversing the query computation graph can include obtaining, from the query computation graph, a candidate negative node and determining whether the candidate negative node overlaps with the cached one or more intermediate nodes. For example, a node from among the set of nodes traversed can be a negative non-answer to the query if there is no overlap between the cached one or more intermediate nodes and the set of nodes traversed while traversing the query computation graph in the second direction from the root node to the node cut. In some implementations, bidirectionally traversing the query computation graph in the first direction from the one or more anchor nodes to the node cut and in the second direction from the root node to the node cut can include randomly sampling one or more negative candidate nodes in the second direction.

Example Devices and Systems

Figure 7A:
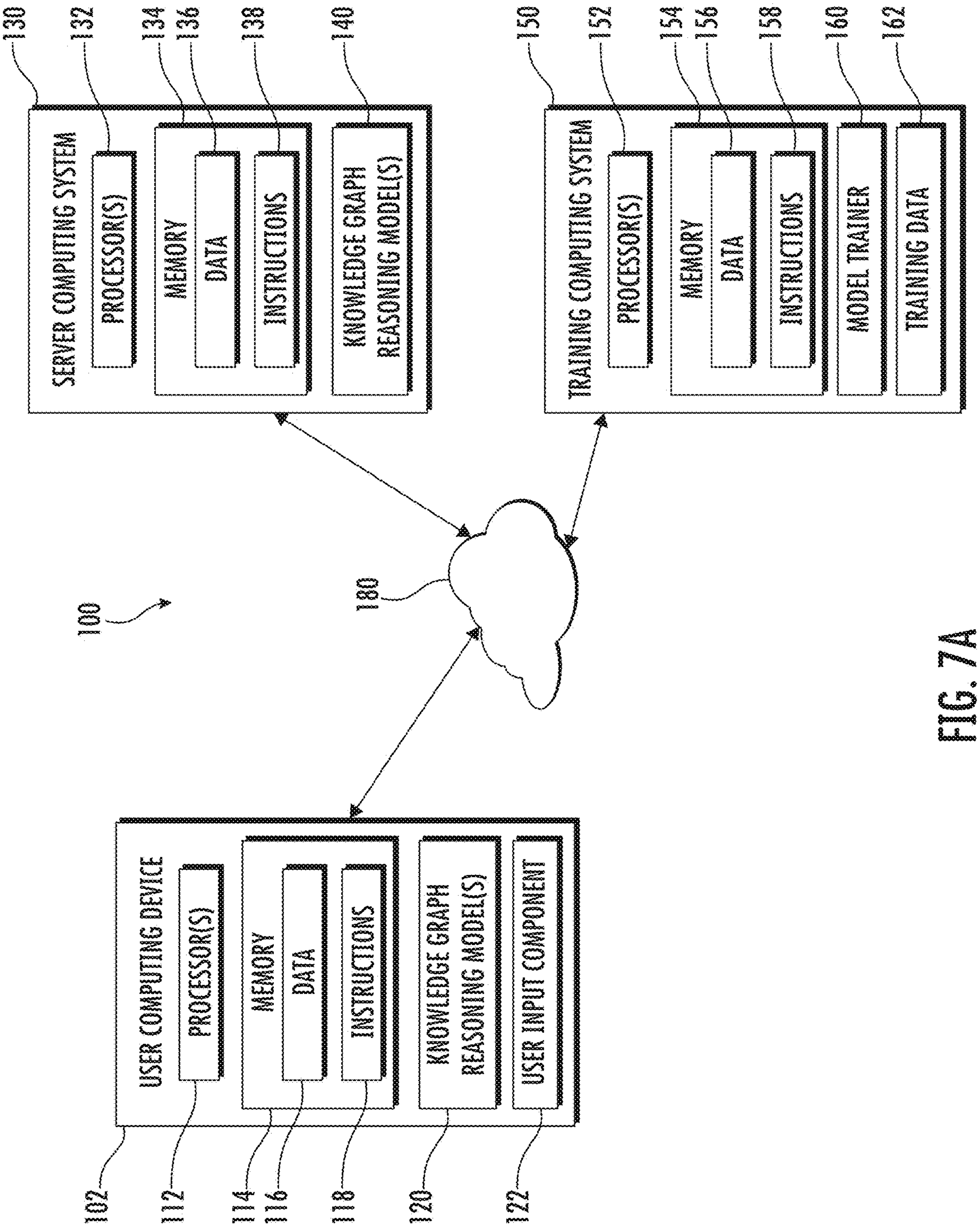
FIGS. 7A-7C depict block diagrams of an example computing system according to example embodiments of the present disclosure.

FIG. 7A depicts a block diagram of an example computing system 100 that performs negative sampling with improved efficiency according to example embodiments of the present disclosure. The computing system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more knowledge graph reasoning models 120. For example, the knowledge graph reasoning models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more knowledge graph reasoning models 120 can be received from the server computing system 130 over network 180, stored in the user computing device memory 114, and then used or otherwise implemented by the one or more processors 112. In some implementations, the user computing device 102 can implement multiple parallel instances of a single knowledge graph reasoning model 120 (e.g., to perform parallel knowledge graph reasoning across multiple instances).

Additionally or alternatively, one or more knowledge graph reasoning models 140 can be included in or otherwise stored and implemented by the server computing system 130 that communicates with the user computing device 102 according to a client-server relationship. For example, the knowledge graph reasoning models 140 can be implemented by the server computing system 130 as a portion of a web service (e.g., a knowledge graph reasoning service). Thus, one or more knowledge graph reasoning models 120 can be stored and implemented at the user computing device 102 and/or one or more knowledge graph reasoning models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more knowledge graph reasoning models 140. For example, the knowledge graph reasoning models 140 can be or can otherwise include various machine-learned models. Example machine-learned models include neural networks or other multi-layer nonlinear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the knowledge graph reasoning models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the knowledge graph reasoning models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the knowledge graph reasoning models 120 and/or 140 based on a set of training data 162.

In some implementations, if the user has provided consent, the training examples can be provided by the user computing device 102. Thus, in such implementations, the knowledge graph reasoning model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 7A illustrates one example computing system that can be used to implement the present disclosure. Other computing systems can be used as well. For example, in some implementations, the user computing device 102 can include the model trainer 160 and the training dataset 162. In such implementations, the knowledge graph reasoning models 120 can be both trained and used locally at the user computing device 102. In some of such implementations, the user computing device 102 can implement the model trainer 160 to personalize the knowledge graph reasoning models 120 based on user-specific data.

Figure 7B:
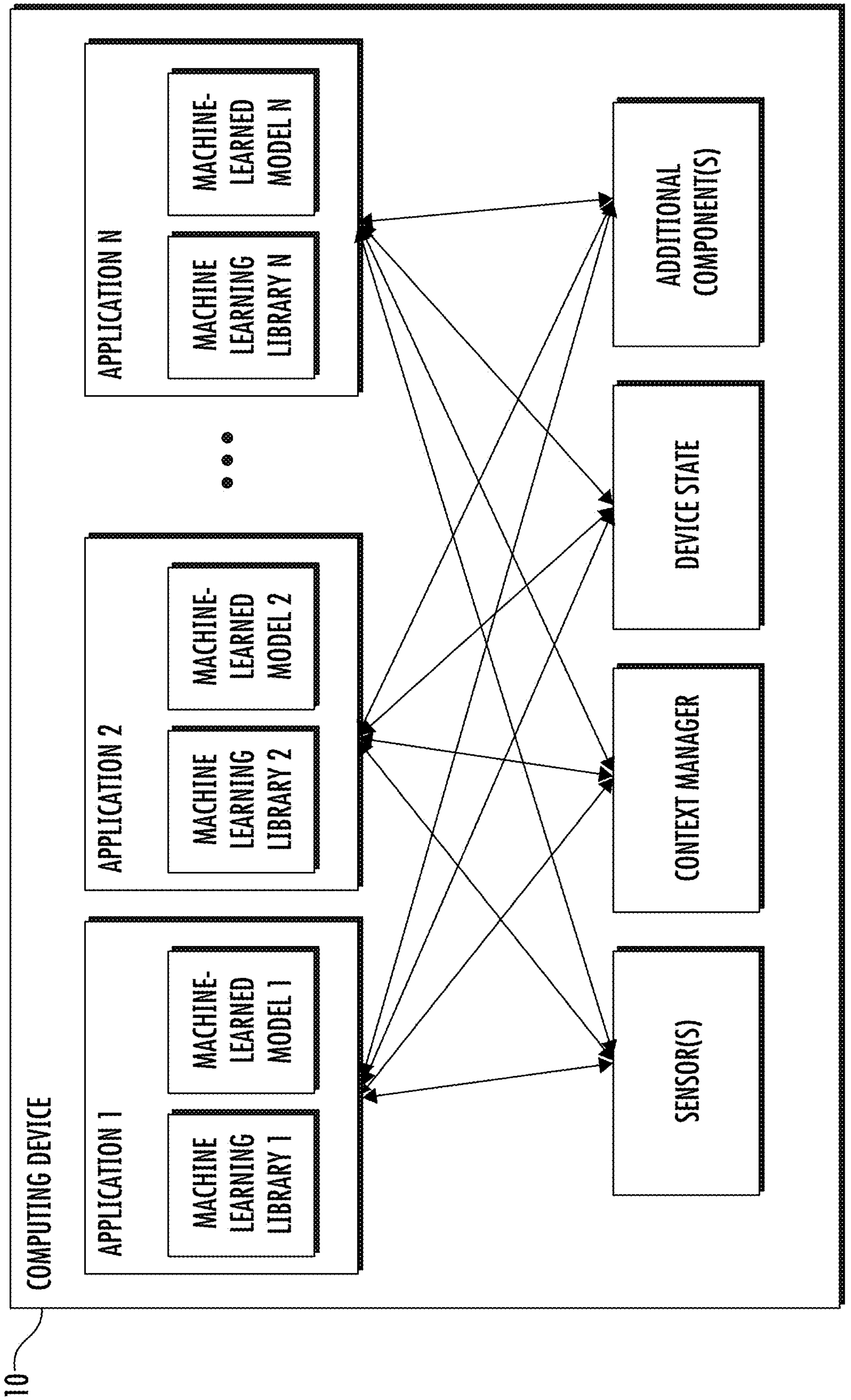

FIG. 7B depicts a block diagram of an example computing device 10 that performs negative sampling with improved efficiency according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 7B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 7C:
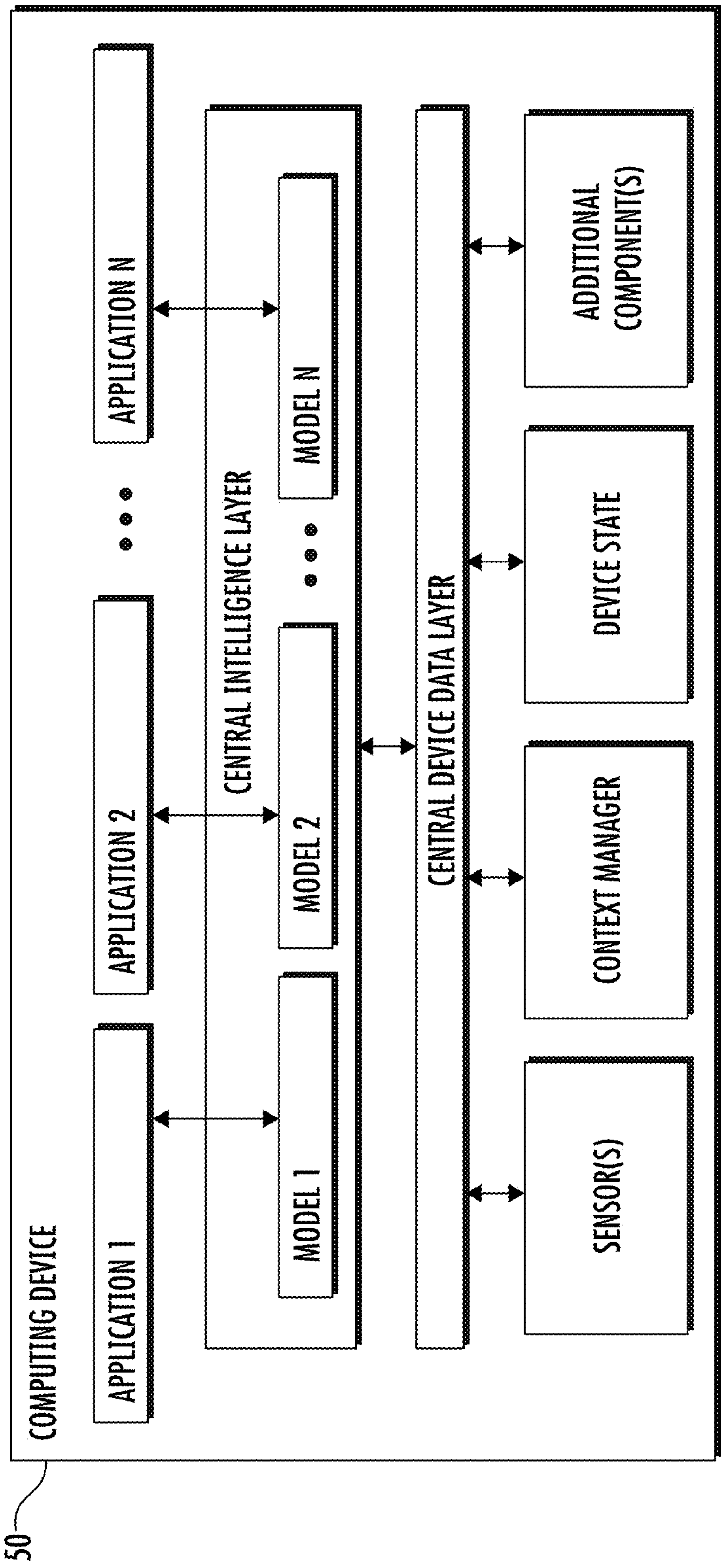

FIG. 7C depicts a block diagram of an example computing device 50 that performs negative sampling with improved efficiency according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 7C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 7C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for negative sampling for contrastive learning with improved efficiency, the method performed by one or more computing devices and comprising:

obtaining a knowledge graph comprising a plurality of entities and a plurality of links between the plurality of entities, wherein a link from among the plurality of links is between at least two entities from among the plurality of entities and describes a relation between the at least two entities;

generating, based on the knowledge graph, a query computation graph comprising a plurality of nodes and a plurality of edges, wherein the plurality of nodes comprises one or more anchor nodes, a root node associated with an answer, and one or more intermediate nodes positioned in one or more paths between the one or more anchor nodes and the root node;

determining a node cut of a query of the query computation graph, wherein the node cut comprises at least one node that cuts at least one path between each anchor node from among the one or more anchor nodes of the query computation graph and the root node of the query computation graph;

identifying one or more negative samples for the query computation graph by bidirectionally traversing the query computation graph in a first direction from the one or more anchor nodes to the node cut and in a second direction from the root node to the node cut; and training a machine-learned model to minimize a distance between the query and the answer and maximize a distance between the query and the one or more negative samples.

2. The method of claim 1, further comprising performing a depth-first search over the query computation graph from the root node of the query computation graph to the one or more anchor nodes of the query computation graph, wherein each node of the query computation graph is grounded to an entity on the knowledge graph and an edge of the query computation graph is grounded to a relation on the knowledge graph associated with a previously grounded entity on the knowledge graph.

3. The method of claim 1, wherein traversing the query computation graph in the first direction from the one or more anchor nodes to the node cut comprises caching the one or more intermediate nodes, wherein the intermediate nodes are obtained while traversing the query computation graph in the first direction.

4. The method of claim 3, further comprising:

comparing overlap of the cached one or more intermediate nodes and a set of nodes traversed while traversing the query computation graph in the second direction from the root node to the node cut; and determining, based on the overlap, that a node from among the set of nodes traversed is a negative non-answer to the query, wherein a negative sample comprises the negative non-answer to the query.

5. The method of claim 4, wherein determining, based on the overlap, that a node from among the set of nodes traversed is a negative non-answer to the query comprises determining that there is no overlap between the cached one or more intermediate nodes and the set of nodes traversed while traversing the query computation graph in the second direction from the root node to the node cut.

6. The method of claim 3, further comprising:

obtaining, from the query computation graph, a candidate negative node; and determining whether the candidate negative node overlaps with the cached one or more intermediate nodes.

7. The method of claim 1, wherein bidirectionally traversing the query computation graph in the first direction from the one or more anchor nodes to the node cut and in the second direction from the root node to the node cut comprises randomly sampling one or more negative candidate nodes in the second direction.

8. The method of claim 1, wherein each node from among the plurality of nodes of the query computation graph corresponds to a set of entities on the knowledge graph and the plurality of edges of the query computation graph represent a logical relational transformation of the set of entities on the knowledge graph.

9. The method of claim 8, wherein the logical relational transformation of the set of entities on the knowledge graph comprises one or more of relation projection, intersection, union, complement, and negation.

10. The method of claim 1, further comprising:

calculating computation costs for one or more node cuts based on paths between each anchor node from among the one or more anchor nodes of the query computation graph and the root node of the query computation graph, wherein the node cut comprises a node cut from among the one or more node cuts with a lowest computation cost.

11. The method of claim 10, wherein calculating the computation costs for the one or more node cuts comprises:

determining a maximum number of relation projections in the paths between each anchor node from among the one or more anchor nodes of the query computation graph and the root node of the query computation graph;

determining a length of a path from each anchor node from among the one or more anchor nodes of the query computation graph to one or more anchor nodes from among the one or more anchor nodes of the query computation graph, wherein the length of the path comprises a number of relation projections on the path; and determining optimal costs of resolving the paths between each anchor node from among the one or more anchor nodes of the query computation graph and the root node of the query computation graph.

12. The method of claim 1, wherein the query computation graph comprises a plan for executing the query, wherein the query is executed in an embedding space.

13. The method of claim 1, wherein the root node of the query computation graph comprises a known positive answer to the query.

14. The method of claim 1, wherein the query is a first-order logical query.

15. The method of claim 1, wherein the knowledge graph is a heterogeneous graph.

16. A computing system for negative sampling for contrastive learning with improved efficiency, the computing system comprising:

one or more processors;

one or more non-transitory computer-readable media that collectively store instructions that, when executed by the one or more processors, cause the one or more processors to perform operations, the operations comprising:

obtaining a knowledge graph comprising a plurality of entities and a plurality of links between the plurality of entities, wherein a link from among the plurality of links is between at least two entities from among the plurality of entities and describes a relation between the at least two entities;

generating, based on the knowledge graph, a query computation graph comprising a plurality of nodes and a plurality of edges, wherein the plurality of nodes comprises one or more anchor nodes, a root node associated with an answer, and one or more intermediate nodes positioned in one or more paths between the one or more anchor nodes and the root node;

determining a node cut of a query of the query computation graph, wherein the node cut comprises at least one node that cuts at least one path between each anchor node from among the one or more anchor nodes of the query computation graph and the root node of the query computation graph;

identifying one or more negative samples for the query computation graph by bidirectionally traversing the query computation graph in a first direction from the one or more anchor nodes to the node cut and in a second direction from the root node to the node cut; and training a machine-learned model to minimize a distance between the query and the answer and maximize a distance between the query and the one or more negative samples.

17. The computing system of claim 16, further comprising performing a depth-first search over the query computation graph from the root node of the query computation graph to the one or more anchor nodes of the query computation graph, wherein each node of the query computation graph is grounded to an entity on the knowledge graph and an edge of the query computation graph is grounded to a relation on the knowledge graph associated with a previously grounded entity on the knowledge graph.

18. The computing system of claim 16, wherein traversing the query computation graph in the first direction from the one or more anchor nodes to the node cut comprises caching the one or more intermediate nodes, wherein the intermediate nodes are obtained while traversing the query computation graph in the first direction.

19. One or more non-transitory computer-readable media that collectively store instructions that, when executed by one or more processors of a computing system, cause the computing system to perform operations, the operations comprising:

obtaining a knowledge graph comprising a plurality of entities and a plurality of links between the plurality of entities, wherein a link from among the plurality of links is between at least two entities from among the plurality of entities and describes a relation between the at least two entities;

generating, based on the knowledge graph, a query computation graph comprising a plurality of nodes and a plurality of edges, wherein the plurality of nodes comprises one or more anchor nodes, a root node associated with an answer, and one or more intermediate nodes positioned in one or more paths between the one or more anchor nodes and the root node;

determining a node cut of a query of the query computation graph, wherein the node cut comprises at least one node that cuts at least one path between each anchor node from among the one or more anchor nodes of the query computation graph and the root node of the query computation graph;

identifying one or more negative samples for the query computation graph by bidirectionally traversing the query computation graph in a first direction from the one or more anchor nodes to the node cut and in a second direction from the root node to the node cut; and training a machine-learned model to minimize a distance between the query and the answer and maximize a distance between the query and the one or more negative samples.

20. The non-transitory computer-readable medium of claim 19, further comprising performing a depth-first search over the query computation graph from the root node of the query computation graph to the one or more anchor nodes of the query computation graph, wherein each node of the query computation graph is grounded to an entity on the knowledge graph and an edge of the query computation graph is grounded to a relation on the knowledge graph associated with a previously grounded entity on the knowledge graph.

* * * * *